(12) United States Patent
Meyer

(10) Patent No.: US 6,662,220 B1
(45) Date of Patent: Dec. 9, 2003

(54) METHOD AND APPARATUS FOR REMOTE COMPUTER MANAGEMENT USING WEB BROWSER AND HYPER-MEDIA MANAGED OBJECT APPLICATIONS

(75) Inventor: John E. Meyer, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/303,118

(22) Filed: Apr. 30, 1999

(51) Int. Cl.[7] .............................................. G06F 13/00
(52) U.S. Cl. ........................ 709/223; 709/227; 709/245; 714/25
(58) Field of Search ................................. 709/224, 220, 709/221, 211, 223, 227, 245; 714/25

(56) References Cited

U.S. PATENT DOCUMENTS

| | | | | |
|---|---|---|---|---|
| 5,964,836 A | * | 10/1999 | Rowe et al. ................. | 709/221 |
| 6,018,619 A | * | 1/2000 | Allard et al. ................. | 709/211 |
| 6,131,118 A | * | 10/2000 | Stupek et al. ................ | 709/223 |
| 6,167,448 A | * | 12/2000 | Hemphill et al. ........ | 707/501.1 |
| 6,212,560 B1 | * | 4/2001 | Fairchild ..................... | 709/223 |
| 6,434,615 B1 | * | 8/2002 | Dinh et al. .................. | 709/224 |

OTHER PUBLICATIONS

TCP/IP Specification, Microsoft Developer Network, Jul. 1998.

* cited by examiner

*Primary Examiner*—Majid A. Banankhah
*Assistant Examiner*—Lilian Vo (57) ABSTRACT

The present invention provides for a method and an apparatus for performing remote system administration upon a standalone computer system, using a controlling computer system. A remote communication sequence is started. The remote communication sequence is used to initiate a Hyper-Media Managed Object (HMMO) request to a computer destination address. Communications between the controlling computer system and the standalone computer system is established by decoding the computer destination address. A diagnostic software application program on the standalone computer system is initiated using the established communication between the controlling computer system and the standalone computer system.

39 Claims, 10 Drawing Sheets

```
typedef struct _EXTENSION_CONTROL_BLOCK {
    DWORD cbSize;                          // size of this struct.
    DWORD dwVersion;                       // version info of this spec
    HCONN ConnID;                          // Context number not to be modified!
    DWORD dwHttpStatusCode;                // HTTP Status code
    CHAR lpszLogData[HSE_LOG_BUFFER_LEN];  // null terminated log info specific to this Extension DLL
    LPSTR lpszMethod;                      // REQUEST_METHOD
    LPSTR lpszQueryString;                 // QUERY_STRING
    LPSTR lpszPathInfo;                    // PATH_INFO
    LPSTR lpszPathTranslated;              // PATH_TRANSLATED
    DWORD cbTotalBytes;                    // Total bytes indicated from client
    DWORD cbAvailable;                     // Available number of bytes
    LPBYTE lpbData;                        // pointer to cbAvailable bytes
    LPSTR lpszContentType;                 // Content type of client data
    BOOL (WINAPI *GetServerVariable)
        (HCONN hConn, LPSTR lpszVariableName, LPVOID lpvBuffer, LPDWORD lpdwSize);
    BOOL (WINAPI *WriteClient)
        (HCONN ConnID, LPVOID Buffer, LPDWORD lpdwBytes, DWORD dwReserved);
    BOOL (WINAPI *ReadClient)
        (HCONN ConnID, LPVOID lpvBuffer, LPDWORD lpdwSize );
    BOOL (WINAPI *ServerSupportFunction)
        (HCONN hConn, DWORD dwHSERRequest, LPVOID lpvBuffer, LPDWORD lpdwSize, LPDWORD lpdwDataType);
} EXTENSION_CONTROL_BLOCK, *LPEXTENSION_CONTROL_BLOCK;
```

FIGURE 5

```
DWORD WINAPI
HttpExtensionProc ( EXTENSION_CONTROL_BLOCK *Ecb )
{
   if ( ! stricmp ( Ecb->lpszPathInfo, "/DFW/Inspect" ) )
   {
      SendInspectInformation ( Ecb, Ecb->lpszPathInfo );

} //end_if
   else
   {
      int length = 0;
      char fileName[_MAX_PATH];
      strcpy ( fileName, Ecb->lpszPathTranslated );
      length = strlen ( fileName );
      ( *Ecb->ServerSupportFunction ) ( Ecb->ConnID,
         HSE_REQ_SEND_GENERIC_FILE,
         0,
         ( unsigned long* ) & length,
         ( unsigned long* ) fileName );
   } //end_else
   return ( HSE_STATUS_SUCCESS );
} //end_fcn HttpExtensionProc
```

FIGURE 6

```c
DWORD
DFWReadInspect ( char *InspectFileName, char *InspectBuffer,
DWORD size )
{
    FILE* stream;
    int i, numread;
        HANDLE hFile;

BOOL found = FALSE;
        WIN32_FIND_DATA lpFindFileData;
    for ( i = 0; i < 2 * 60; i++ )
    {

/* Find first file in current directory */
        if ( ( hFile = FindFirstFile ( InspectFileName, &lpFindFileData ) )
 != NULL )
        {
            FindClose ( hFile );
            found = TRUE;
            break;
        } //end_if
        FindClose ( hFile );
        Sleep ( 1000 );
    } //end_for if ( found == FALSE )
        return - 1L;

if ( ( stream = fopen ( InspectFileName, "r+t" ) ) != NULL )
    {
                if( lpFindFileData.nFileSizeLow > size )
                    size = lpFindFileData.nFileSizeLow;
        numread = fread ( InspectBuffer, sizeof ( char ), size, stream );
        fclose ( stream );
        return 0;
    } //end_if
    else
        return - 1L;
} //end_fcn DFWReadInspect
```

METHOD AND APPARATUS FOR REMOTE COMPUTER MANAGEMENT USING WEB BROWSER AND HYPER-MEDIA MANAGED OBJECT APPLICATIONS

COMPUTER PROGRAM LISTING APPENDIX

A compact disc has been submitted to the U.S. Patent and Trademark Office containing a computer program listing appendices A–D, which is incorporated by reference herein. The computer program listing appendices A–D are contained in a text file named "Appendix.txt". The compact disc is recorded in CD-R format, which is compatible with IBM PC-compatible computers and Apple Macintosh computers employing MS-Windows and Macintosh operating systems, respectively.

BACKGROUND OF THE INVENTION

1. Field of the Invention

This invention relates generally to remote computer accessing, and, more particularly, to performing computer diagnostics and computer management using a web browser application program and a Hyper-media Managed Object application program.

2. Description of the Related Art

Performing computer diagnostics and computer management are essential tasks for maintaining proper operation of computers. Modern computers have multiple complex hardware components that cooperate to perform computer operations. Integration of complex hardware and software in computers can result in several technical problems that compromise optimal performance of computers. Many times, a computer professional's services are required to remedy computer diagnostic problems.

Much of the consultations performed by computer experts are conducted via the telephone. Often, a computer user will communicate with a computer consultant over a telephone and run certain computer software application programs and report back to the computer consultant. This can be a tedious, as well as an inefficient, process. Many times, the computer operator will not be familiar with the hardware and software details to properly advise the computer consultant of the problems at hand. The computer consultant is then forced to iteratively narrow down possible hardware or software problems.

Often, a computer consultant performs an on-site inspection of a computer that has been experiencing operational problems. Alternatively, a computer which is experiencing operational problems is taken off-site, to a computer consultant. Both of the options, on-site and off-site inspections, are very time-consuming and costly. Several diagnostic evaluations must be performed on a computer which is experiencing operational problems before a course of corrective action is taken. One of the tools utilized by computer experts is the execution of diagnostic software application program. Generally, the execution of a diagnostic software application program initiates a series of tests on a computer system. Often the knowledge of an experienced computer technician is required to evaluate the results of the tests performed by the diagnostic tool. Computer systems are generally complex and may host many peripheral devices that must cooperate properly. Consequently, software systems that analyze and diagnose computer systems are increasingly complex. Therefore, users who are not extensively trained in evaluation of computer systems are often unable to properly execute computer diagnostic software.

Many times, attempts to evaluate and resolve computer problems over a telephone conversation are futile since the computer user may not be able to execute the computer diagnostic tool and report back the results. Therefore, a site visit from a computer technician is often the only practical solution for some computer-related problems. The cost associated with a site visit by a computer technician compounds the problems related to computer malfunction. Beyond the cost of the consultation from a computer technician, delay, due to the non-operation of the computer system while awaiting a site visit, could bring about additional productivity-related costs. A visit from a computer technician not only halts productivity before the technician arrives, productivity could be suspended while the technician performs tests, evaluation, and repairs on the computer system.

The present invention is directed to overcoming, or at least reducing the effects of, one or more of the problems set forth above.

SUMMARY OF THE INVENTION

In one aspect of the present invention, a method is provided for performing remote system administration upon a standalone computer system, using a controlling computer system. A remote communication sequence is started. The remote communication sequence is used to initiate a Hyper-Media Managed Object (HMMO) request to a computer destination address. Communication between the controlling computer system and the standalone computer system is established by decoding the computer destination address. A diagnostic software application program on the standalone computer system is initiated using the established communication between the controlling computer system and the standalone computer system.

In another aspect of the present invention, an apparatus is provided for performing remote system administration upon a standalone computer system, using a controlling computer system. The apparatus of the present invention further comprises: means for starting a remote communication sequence; means for using the remote communication sequence to initiate an HMMO request to a computer destination address; means for establishing communication between the controlling computer system and the standalone computer system by decoding the computer destination address; and means for initiating a diagnostic software application program on the standalone computer system using the established communication between the controlling computer system and the standalone computer system.

BRIEF DESCRIPTION OF THE DRAWINGS

The invention may be understood by reference to the following description taken in conjunction with the accompanying drawings and appendices, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
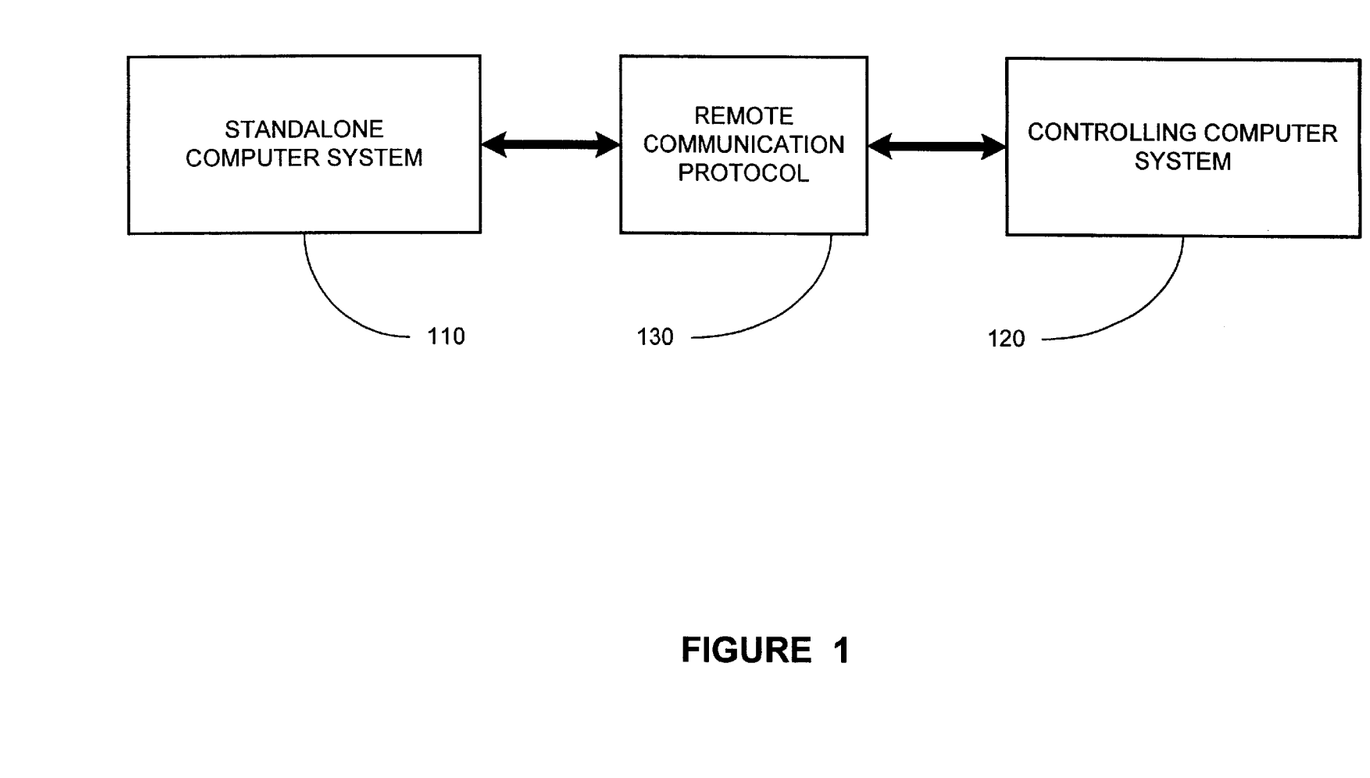
FIG. 1 is an illustration of one embodiment of the apparatus that facilitates the implementation of the present invention: a block diagram of a controlling computer system communicating with a standalone computer system using a remote communication protocol.

Turning now to FIG. 1, one embodiment of a system that employs the present invention is illustrated. A standalone computer system 110 is electronically connected to a controlling computer system 120 through a remote communication protocol 130. The standalone computer system 110, in one embodiment, is a client computer system that is operational at a remote site, such as an office or a home. In one embodiment, the controlling computer system 120 is a computer controlled by a computer technician. Generally, the controlling computer system 120 is located at a remote office (not shown). In one embodiment, the standalone computer system 110 and the controlling computer system 120 may be comprised of a Macintosh system, a UNIX system, a PC system, a VAX system, a Workstation system, or any other system employed by those skilled in the art.

The remote communication protocol 130, in one embodiment, consists of a communication system that allows the controlling computer system 120 to perform system administration tasks upon the standalone computer system 110. One embodiment of the remote communication protocol 130 is illustrated in FIG. 2.

Figure 2:
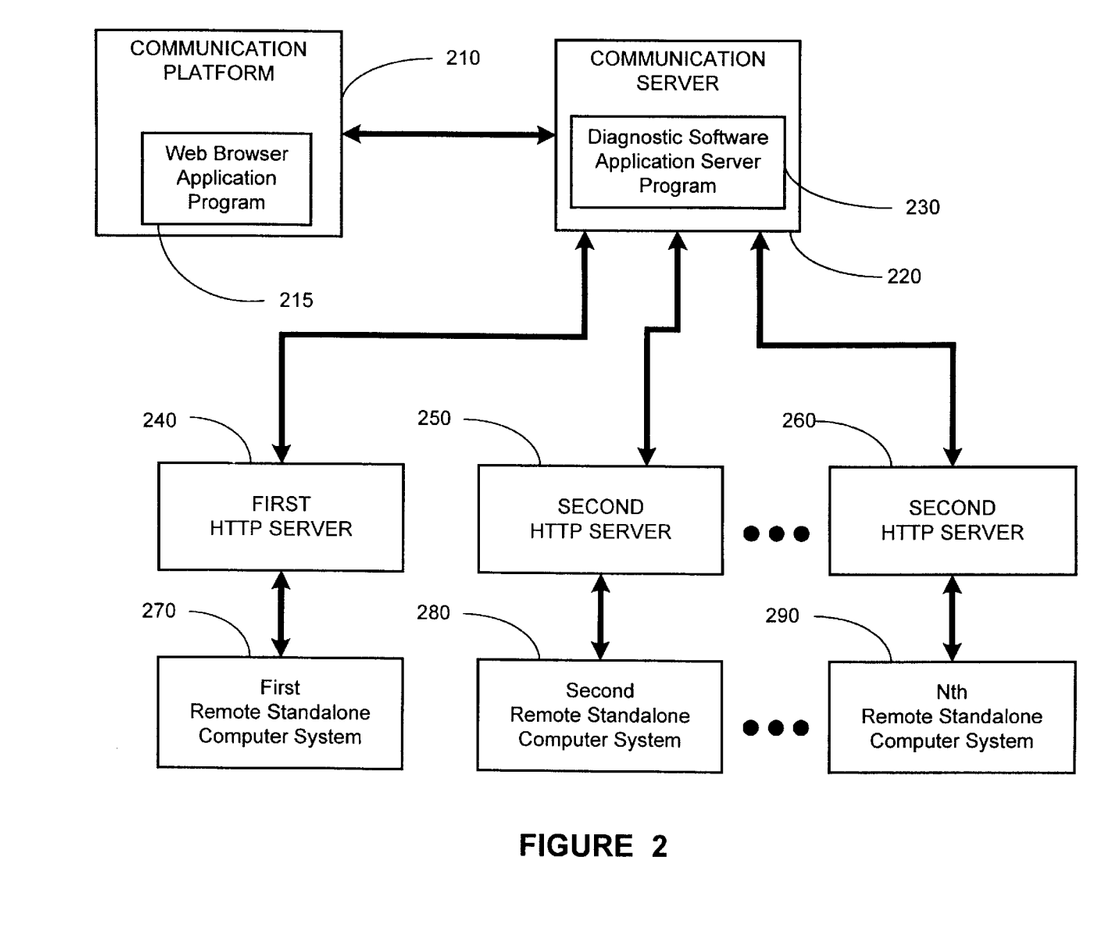
FIG. 2 illustrates one embodiment of the remote communications protocol described in FIG. 1.

Turning now to FIG. 2, one embodiment of a more detailed depiction of the remote communication protocol 130 is illustrated. A communication platform 210 is electronically coupled to a communication server 220. The communication platform 210 includes a browser application program 215 for Internet/Intranet communication. In one embodiment, the communication server 220 facilitates data transfer between the standalone computer system 110 and the controlling computer system 120.

The communication server 220 is electronically connected to a first through Nth HTTP servers 240, 250, 260. The communication server 220 directs diagnostic control from the web browser application program 215 to the first through Nth HTTP servers 240, 250, 260. In one embodiment, the first through Nth HTTP servers 240, 250, 260 are located within the remote standalone computer systems 270, 280, 290. In one embodiment, the first through Nth remote standalone computer systems 270, 280, 290 are configured to be Hyper-media Managed Objects (HMMO).

Figure 3:
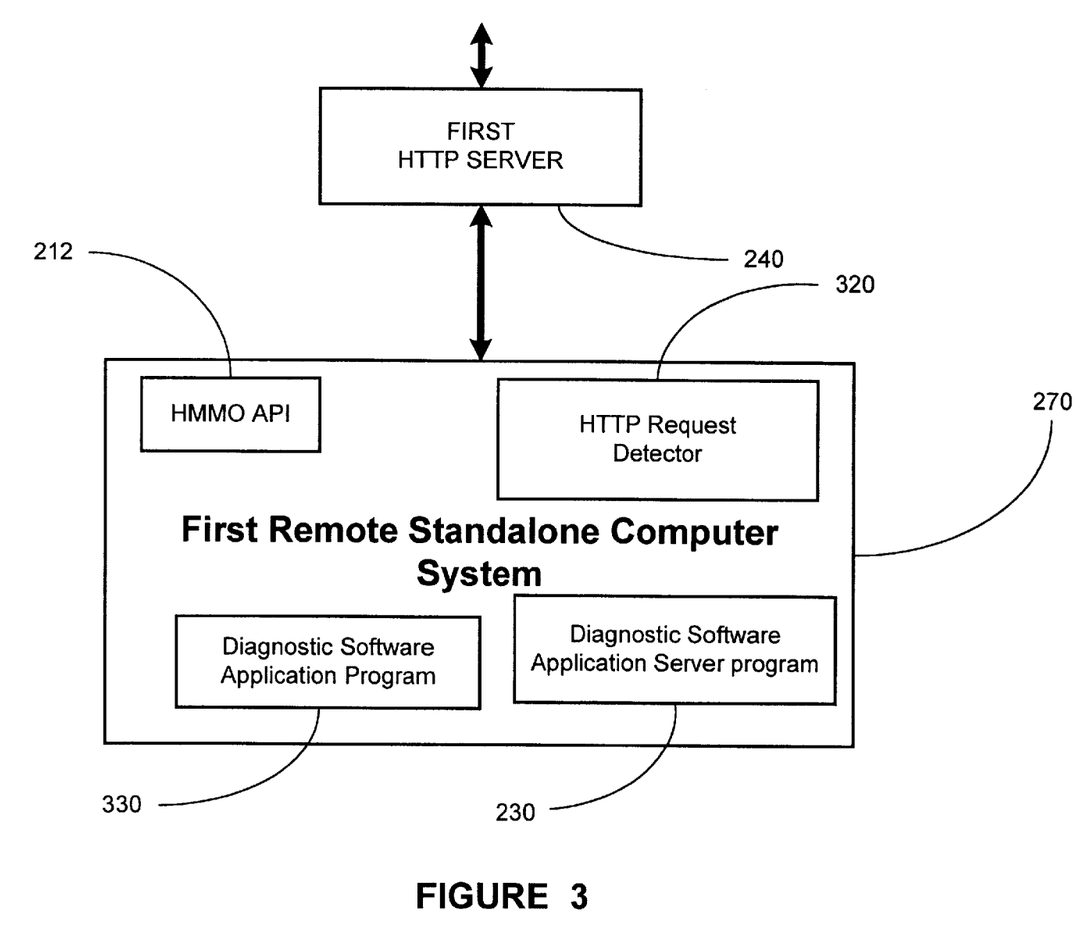
FIG. 3 illustrates a more detailed depiction of the communication system described in FIG. 2.

The remote standalone computer systems 270, 280, 290 include a Hyper-Media Managed Object Application Program (HMMO API) 212 (FIG. 3). The HMMO API 212 is used by the remote standalone 270, 280, 290 to facilitate communications between the web browser program 215 and the first through Nth remote standalone computer systems 270, 280, 290.

In one embodiment, communications between the controlling computer system 120 and the first through Nth remote standalone computer systems 270, 280, 290 are facilitated by a HTTP requests, within the web browser application program 215, in the communication platform 210. A Hypertext Transfer Protocol (HTTP) program, along with Hyper-text Markup Language (HTML) is employed by the present invention to facilitate communications between the controlling computer system 120 and the first through Nth remote standalone computer systems 270, 280, 290.

HTML is a set of "markup" symbols or codes inserted in a file intended for display on a World Wide Web browser. The markup tells the Web browser application program 215 how to display a Web page's words and images for the user. HTML is defined in practice by both of the major Web browser developers, Netscape® and Microsoft®. Netscape® and Microsoft® are in the process of adding changes to their respective web browser application programs, and more officially for the industry, through the World Wide Web Consortium (W3C). A new version of HTML, called HTML4, has recently been officially recommended by the W3C, making this level an effective industry standard. However, both Netscape® and Microsoft® have implemented some features differently into their web browser application programs and they have provided non-standard extensions. Web developers using the more advanced features of HTML4 may have to design pages for both web browsers applications and send out the appropriate version to the users. Significant features in HTML4 are sometimes described in general as dynamic HTML. The method and apparatus taught by the present invention can be implemented on different types of web browser applications.

In one embodiment, an HMMO is a management agent that can render its information as HTML pages. A client application requesting the HTML pages may be a web browser application program 215 or other Hypertext Transfer Protocol (HTTP) client applications, such as a Hyper-Media Management Application (HMMA).

Hypertext Transfer Protocol (HTTP) is the set of rules for exchanging files on the World Wide Web. The files exchanged under the HTTP guidelines include text files, graphic image files, sound files, video files, and other multimedia files. Essential concepts that are part of HTTP include the idea that files can contain references to other files whose selection will elicit additional transfer requests. Generally, Web server machines contain, in addition to the HTML and other files it can serve, an HTTP daemon. The HTTP daemon is a program that is designed to wait for HTTP requests and handle them when they arrive. The web browser application program 215 is an HTTP client, sending requests to server machines. When the user of the web browser application program 215 enters a file request by either "opening" a Web file by typing in a Uniform Resource Locator (URL), or clicking on a hypertext link, the web Browser application program 215 builds an HTTP request and sends it to the Internet Protocol address (IP address) that is indicated by the URL. The HTTP daemon in the destination server machine receives the request and, after any necessary processing, the requested file is returned.

In order for an HMMO to be able to provide the management information as HTML pages, it must have access to an HTTP server. The HTTP server will listen for HTTP requests at a configured port and trigger the HMMO to provide its information when an HTTP request is received. In order to reduce undesirable interactions between multiple HMMOs and the crash potential of the HMMOs, each HMMO, or remote standalone computer system 270, 280, 290, is given its own corresponding HTTP server. Therefore, the first through Nth remote standalone computer systems 270, 280, 290, which are configured as HMMOs, are equipped with a first through Nth HTTP server 240, 250, 260, respectively. Utilizing the first through Nth HTTP servers 240, 250, 260, the first through Nth computer systems 270, 280, 290 are able to monitor their respective HTTP configured port (not shown) and "listen" for HTTP requests from the controlling computer system 120.

In one embodiment, the controlling computer system 120 is electronically coupled with the first through Nth HTTP servers 240, 250, 260. The first through Nth HTTP servers 240, 250, 260 are electronically coupled to a first through Nth remote standalone computer system, 270, 280, 290, respectively. In an alternative embodiment, the first through Nth HTTP servers 240, 250, 260 are located within the first through Nth remote standalone computer systems 270, 280, 290.

Generally, the controlling computer 120 addresses the first remote standalone computer system 270 through the first HTTP server 240 via the communication platform 210. Once communication is established between the controlling computer 120 and the remote standalone computer system 270, computer diagnostics can be performed. The diagnostic software application server program 230 controls a computer administration process that is capable of performing multiple status and diagnostic checks on remote standalone computer systems. In one example, the controlling computer system 120 will perform an overview status check on the remote standalone computers 270, 280, 290. Such a status will yield information such as remote standalone computer's processor type, the total memory in the remote standalone computer 270, peripheral devices that are interfaced with the remote standalone computer 270, etc. The controlling computer system 120 will be able to display a screen that is substantially similar to the screen that would be displayed if a local diagnostic software application program were to be executed locally on the remote computers 270, 280, 290. The system administration performed on the first through Nth remote standalone computer systems 270, 280, 290 are performed in a similar manner.

Utilizing the remote communication protocol 130, the controlling computer system 120 can display a screen that lists the status of the subsystems of the remote standalone computers 270, 280, 290, such as the status of input devices (not shown). These input devices include the keyboard, joystick, mouse, etc. Therefore, if a problem regarding any of the aforementioned subsystems is suspected, an operator using the controlling computer system 120 will be able to address the problem by accessing the status of the subsystems and narrowing down the list of possible causes of the problem. Furthermore, utilizing the remote communication protocol 130, an operator can test the internal memory of the remote standalone computers 270, 280, 290 by accessing their respective memory sections and testing them.

In one embodiment, one test performed on the internal memory of the remote standalone computers 270, 280, 290 includes performing a write and read-back test. The write and read-back test includes writing certain values into the internal memory locations of the remote standalone computers 270, 280, 290 and then reading the values back to insure that memory locations are functioning properly. Other remote diagnostic tests can be performed on the remote standalone computers 270, 280, 290 by utilizing the remote communication protocol 130 describe in the present invention.

Turning now to FIG. 3, a more detailed depiction of the communication system described in FIG. 2 is illustrated. The HTTP server 240 facilitates HTML communication with the first remote standalone computer system 270. An HTTP request detector 320 detects incoming HTTP data. In one embodiment, the HTTP request detector 320 is capable of decoding HTML computer destination addresses. When the HTTP request detector 320 checks and confirms an address data packet sent by the controlling computer 120 to the first remote standalone computer system 270, a communication link between the controlling computer 120 and the first remote standalone computer system 270 is established. Communication between the controlling computer system 120 and the second through Nth remote standalone computer systems 280, 290 are also performed in a similar manner.

The first through Nth remote standalone computers 270, 280, 290 contain a diagnostic software application program 330 that is accessible through the diagnostic software. The diagnostic software application server program 230 facilitates data transfer between a web browser application program 215 (see FIG. 2) and the first through Nth remote standalone computers 270, 280, 290. The HTTP server 240, in conjunction with the web browser application program 215, initiates and controls the diagnostic software application programs 330.

The controlling computer system 120, which in one embodiment contains the web browser application program 215, can gain access to the diagnostic software application programs 330 in the first through Nth remote standalone computers 270, 280, 290 through the communication path described above. Utilizing the software and hardware computer communication system described above, the controlling computer system 120 can perform system administration on the first through Nth remote standalone computer systems 270, 280, 290.

Figure 4:
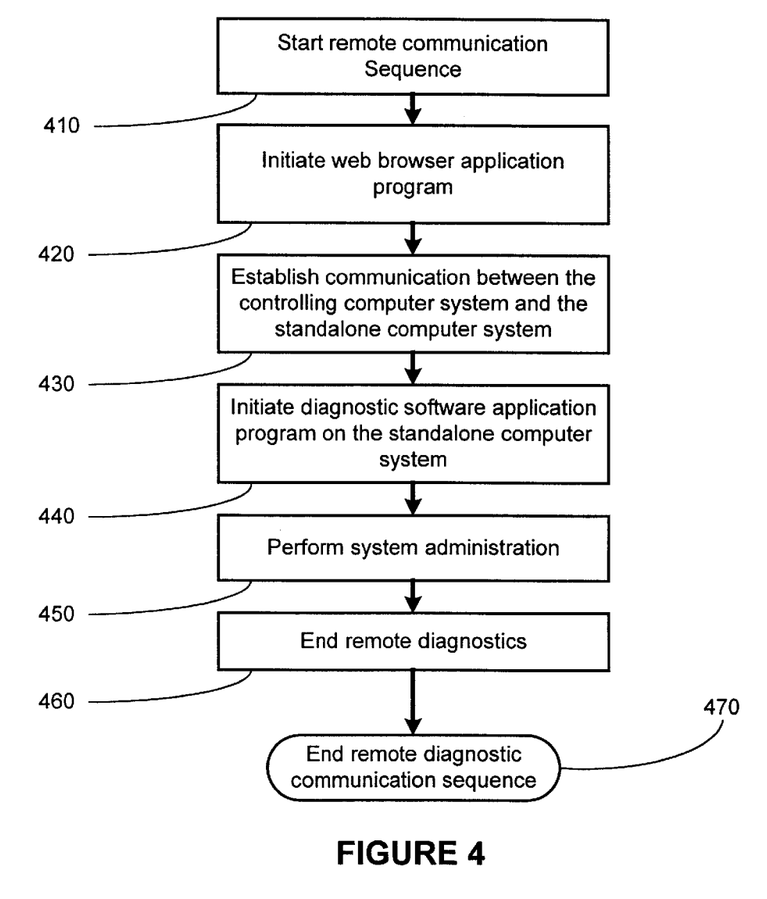
FIG. 4 illustrates a block diagram of the method of system administration by the controlling computer described in FIG. 1.

A block diagram of the method of system administration by a controlling computer system is illustrated in FIG. 4.

Turning now to FIG. 4, the remote system administration described by the present invention is initiated by starting a remote communication sequence, as described in block 410. In blocks 420 and 430, the web browser application is initiated and communication is established between the controlling computer 120 and the standalone computer 110.

In one embodiment, the controlling computer 120 initiates an HTTP request to a specific address. The HTTP facilitates HTML communication with the first through Nth remote standalone computer systems 270, 280, 290, which in one embodiment are configured as Hyper-Media Managed Objects (HMMO). The HTTP server 310 in the first remote standalone computer system 270 receives an HTTP request and sends it to the HTTP request detector 320. When the HTTP request detector 320 decodes the proper address for the first remote standalone computer 270, an internet/intranet communication line is established between the controlling computer system 120 and the first remote standalone computer system 270.

In one embodiment, the standalone computer system 110 is capable of employing Hyper-Media Managed Object Application Programming Interface 212 (HMMO API). The HMMO API 212 is well known by those skilled in the art and have the benefit of the present invention. The HMMO API 212 is capable of operating in multiple operating systems, such as Microsoft Windows® and Windows NT®. In one embodiment, the HMMO API 212 is delivered as a binary library and "C" program header file. In one embodiment, the files with the "HTML/" prefix are generally found in an "HTML" sub-directory of the calling program. The files residing in the "HTML/" directory allow the HMMO API 212 binary library to present a default home page for an individual HMMO, such as said first remote standalone computer system 270. In one embodiment, most of the HMMO API 212 functions are used primarily to configure, start, and stop operations of the first through Nth HTTP servers 240, 250, 260.

In one embodiment, the standalone computer system 110 is also capable of employing an Internet Server Application Programming Interface (ISAPI). The ISAPI protocol is well known by those skilled in the art and who have the benefit of the present invention. One example of the Internet Server Application Programming Interface (ISAPI) is a communication technology offered by Microsoft®. In one embodiment, the present invention employs an ISAPI Dynamic Link Library (DLL) application for the operation on the first through Nth HTTP servers 240, 250, 260, for Internet/Intranet communications. Operations of DLL applications are well known by those skilled in the art and who have the benefit of the present invention.

ISAPI applications provide a simple and efficient method of facilitating communication to multiple ISAPI-compliant Hypertext Transfer Protocol (HTTP) servers located within the first through Nth HTTP servers 240, 250, 260. Generally, Internet Server Applications (ISA) operate in the same address space as the HTTP servers. Furthermore, the ISA is capable of accessing all computer resources available to the HTTP servers located within the first through Nth web servers 240, 250, 260. Internet Server Applications generally have low overhead (relating to computer resources) because they do not require the creation of additional processes. Furthermore, the ISA will consume low overhead because they generally do not perform time-consuming communications across process boundaries.

Figure 5:
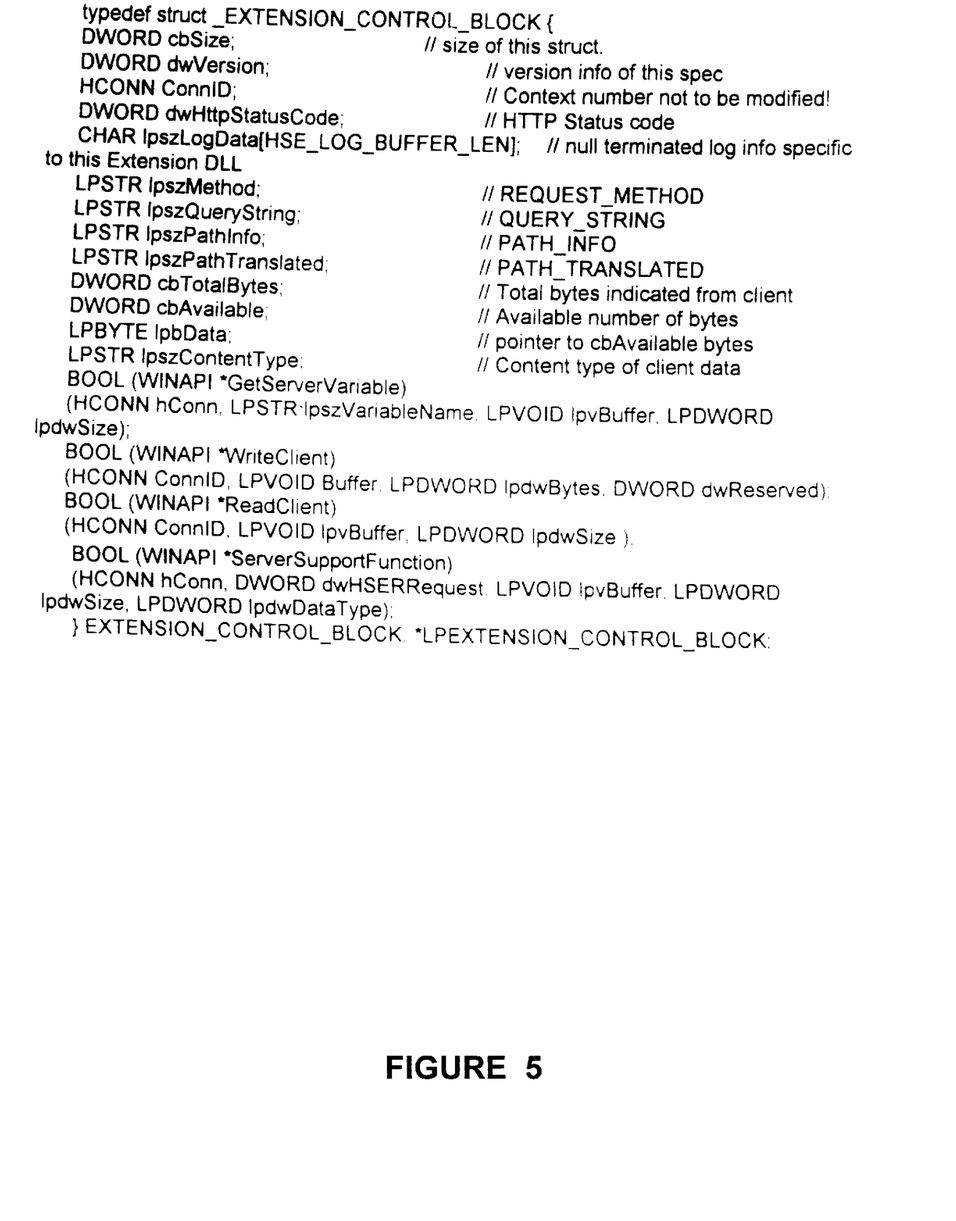
FIG. 5 illustrates one embodiment of an HTTP request structure called the EXTENSION_CONTROL_BLOCK pointer.

An HTTP extension procedure function (HTTPExtensionProc function) is called by the HTTP servers 240, 250, 260 for each HTTP request targeted to the ISAPI extension. A structure called EXTENSION_CONTROL_BLOCK structure, provided to the call, contains the necessary HTTP request information to completely process an HTTP request. One embodiment of the EXTENSION_CONTROL_BLOCK structure is illustrated in FIG. 5.

When a software procedure known as HttpExtensionProc is called, the typical ISAPI extension will examine an IpszPathInfo parameter to see the URL requested and then determine which task is processed. The ISAPI extension will then use a combination of calls to the ServerSupportFunction and WriteClient Function pointers to return information to the requesting entity, which is generally the standalone computer system 120. In many cases, an ISAPI extension will map a URL to a file residing in a directory. This directory can be a known location, with no support from the HMMO API binary library. Alternatively, the ISAPI extension can be mapped to the HTTP server file pool implemented by the HMMO API binary library. The ISAPI structure variable IpszPathTraslated, and the complementary ISAPI/CGI variable PATH_TRANSLATED, provide a generic means of locating the mapped directory for a URL, if it is located in the HTTP server file pool. The mapping of a URL to the HTTP server file pool is based on the UrlBase provided when the ISAPI extension was registered, as illustrated by the following example:

ISAPI extension DFW (diagnostic application such as Compaq Diagnostics®);
Name=/DFW
UrlBase=C:/DFW/Html
URL is;
//IP:PORT/DFW/default.htm
PATH_TRANSLATED and IpszPathTranslated would be;
C:/DFW/Html/default.htm.

Figure 6:
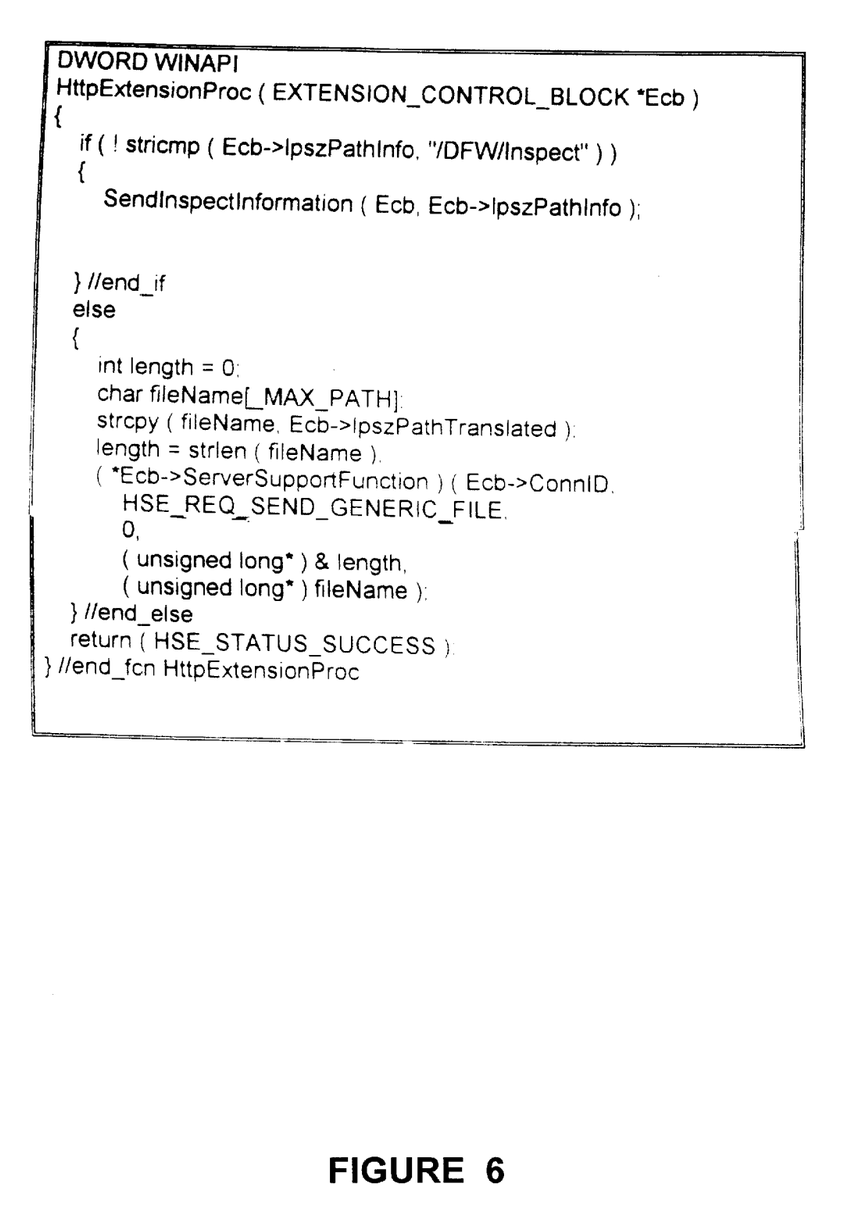
FIG. 6 illustrates one embodiment of the source code implementation for a software procedure known as HttpExtensionProc, which in one embodiment is capable of identifying an HTTP request.

In some cases, UrlBase is not provided during registration. In such cases, the ExtensionBase, which is generally provided when the HTTP server is configured, is copied as the UrlBase. The IpszPathInfo parameter is examined to see if the URL requested is "/DFW/Inspect", which designates a request to capture hardware and operating system information using the diagnostic software application program 330, such as Compaq Diagnostics®. One embodiment of the source code implementation for the HttpExtensionProc is illustrated in FIG. 6. One embodiment of the entry source code implementation for the HMMO is illustrated in Appendix A, which forms a part incorporated into the present detailed description, as if set forth fully below.

When HttpExtensionProc identifies a request to capture hardware and operating system information (/DFW/Inspect), then the diagnostic software application program 330, such as Compaq Diagnostics® For Windows® (DFW) application process is initiated in silent mode to perform this task. One embodiment of a source code implementation for performing the steps of gathering and formatting computer hardware and operating system information is provided in Appendix B, which forms a part incorporated into the present detailed description, as if set forth fully below.

Figure 7:
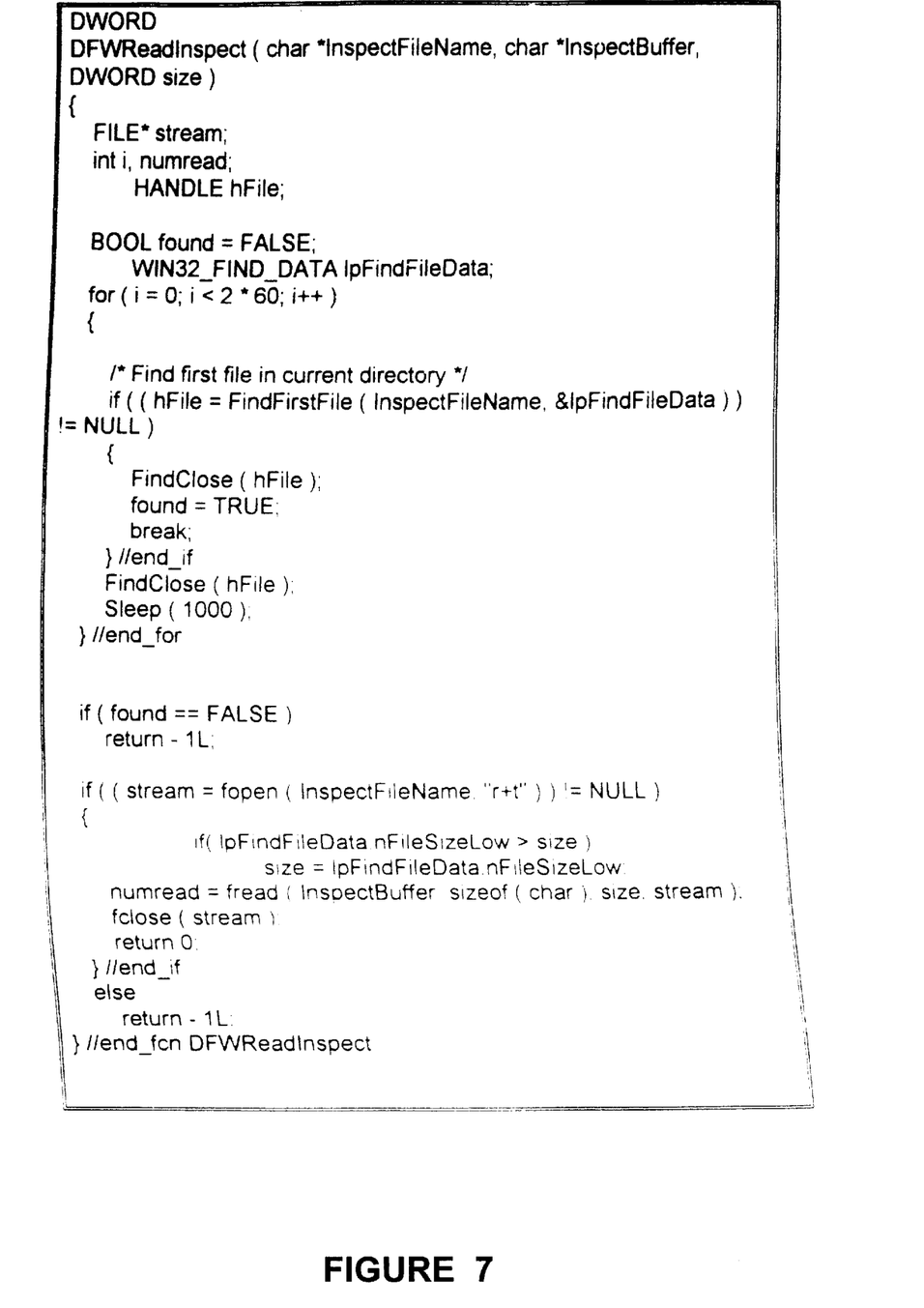
FIG. 7 illustrates one embodiment of the source code for reading the information processed by the diagnostic software application program (DFWReadInspect)

One embodiment of a source code implementation for initiating the diagnostic software application program 330 is illustrated in Appendix C, which forms a part incorporated into the present detailed description, as if set forth fully below. In one embodiment, the information gathered is specified to be written to an ASCII text file. The ASCII text file name is derived from the date and time the information is requested. One embodiment of the source code for reading the information processed by the diagnostic software application program 330 (DFW ReadInspect) is illustrated in FIG. 7. Once the diagnostic software application process is completed, the ASCII text file is read and formatted into HTML format as shown in the output of the Compaq Inspect® For Windows® output, which is illustrated in Appendix D, which forms a part incorporated into the present detailed description, as if set forth fully below.

The diagnostic software application program 330, such as Compaq Diagnostics®, is initiated on the standalone computer system 110, as described in block 440 of FIG. 4 and described above. Utilizing the communication system described above, the controlling computer system 120 performs system administration on the standalone computer system 110, as described in block 450 of FIG. 4. The system administration tasks performed on the standalone computer system include inspection of the hardware and software, status checks, hardware tests, and asset management.

Figure 8:
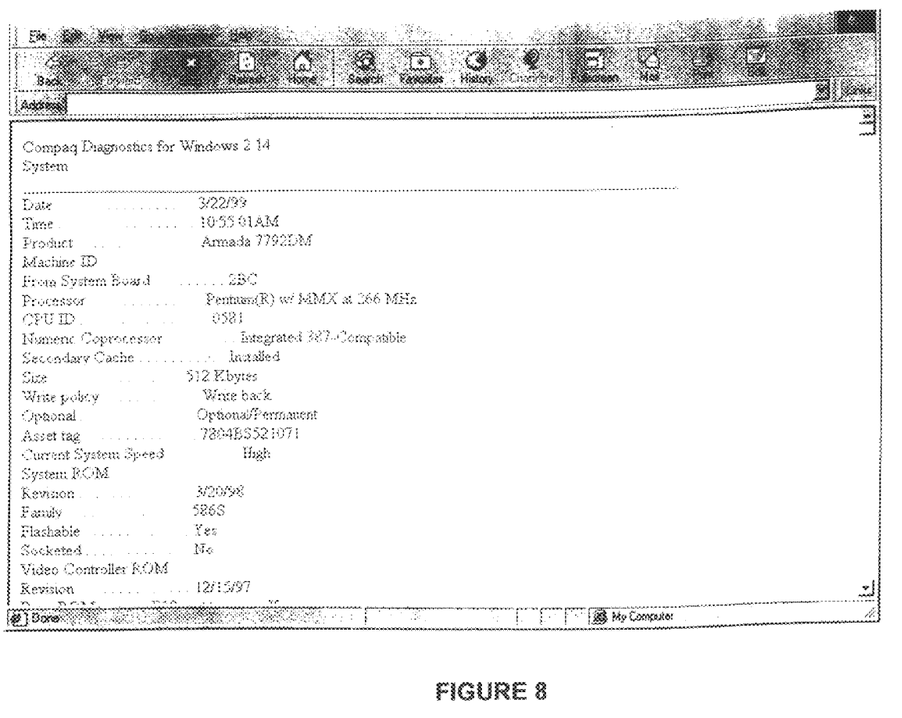
FIG. 8 illustrates one example of the inspection of the hardware and software in a standalone computer, performed by Compaq Diagnostics® and reported over the Internet or intranet, as implemented by the present invention.
Figure 9:
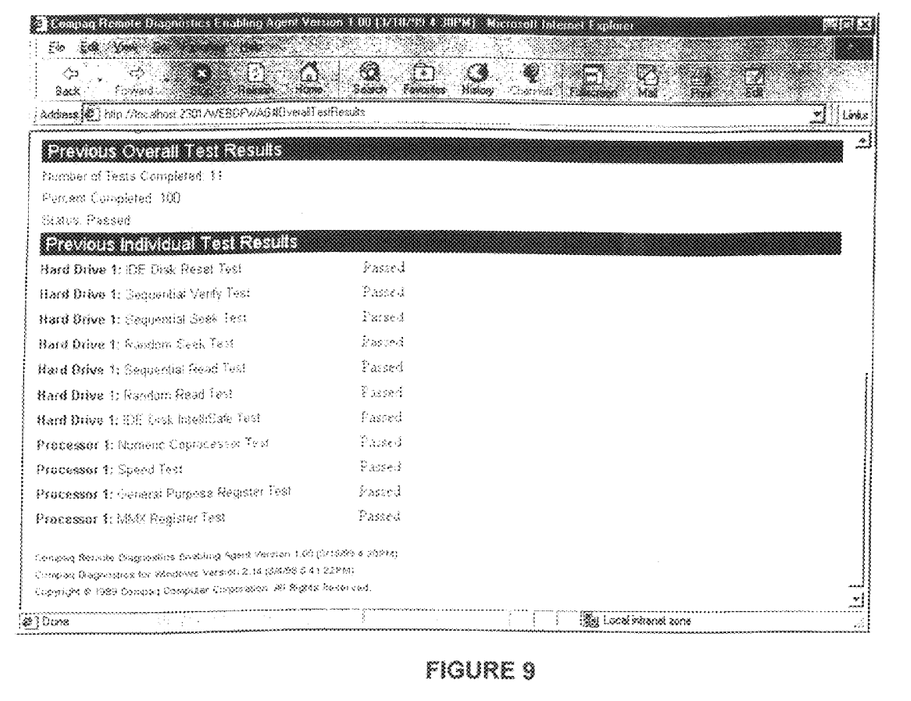
FIG. 9 illustrates one example of the status check of a standalone computer, performed by Compaq Diagnostics® and reported over the Internet or intranet, as implemented by the present invention.

One example of inspection of the hardware and software in a standalone computer 110, performed by Compaq Diagnostics® and reported over the Internet or Intranet, is illustrated in FIG. 8. As illustrated in FIG. 8, the computer system-type, the processor type, the storage device type, the software version are detected remotely, using the principles of the present invention. Computer status, such as the expansion bus and the current computer system speed, can be obtained by using the principles described in the present invention. One example of the status check of a standalone computer 110, performed by Compaq Diagnostics® and reported over the Internet or Intranet, is illustrated in FIG. 9.

Figure 10:
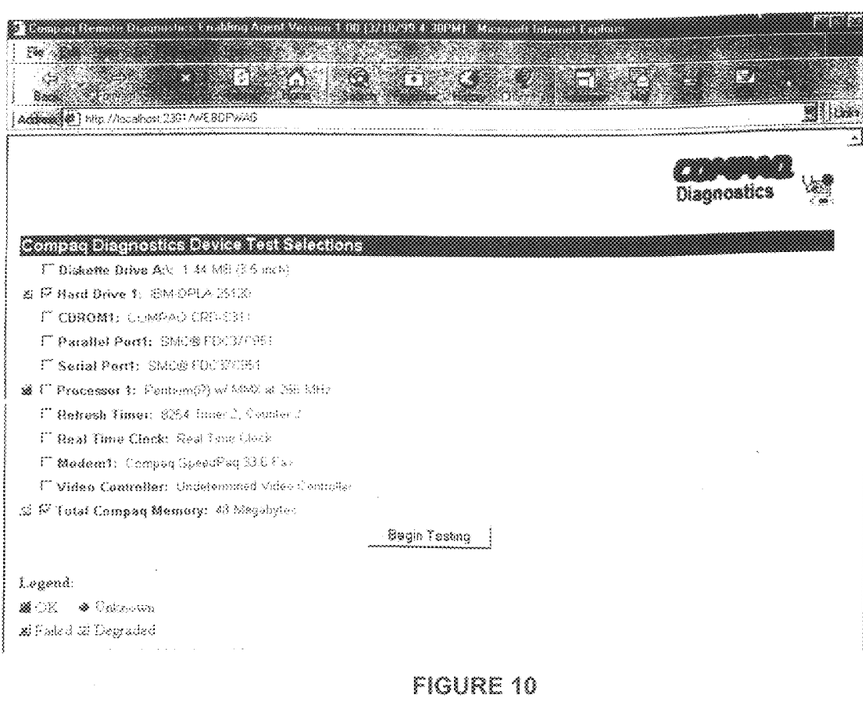
FIG. 10 illustrates one example of a screen display, in Compaq Diagnostics® software application, that allows a user to perform remote testing of a standalone computer system, as implemented by the present invention.

Many types of hardware and software tests can be performed upon a standalone computer 110 using the principles taught by the present invention. One example of a hardware test is to write to a certain register in the main Central Processing Unit (CPU), and read back and verified correct the value in that particular register. If the data that was written in the CPU register is read back, then the write/read test can be deemed successful. Other hardware tests, such as testing of computer peripherals, can be performed using the present invention. One example of a screen display, in the Compaq Diagnostics® software application program, that allows a user to perform remote testing of a standalone computer system 110, is illustrated in FIG. 10.

Other system administration tasks, such as asset management of computer peripherals, can be performed by implementing the present invention. Audit trails of peripherals in standalone computer systems 110, such as computer systems within a corporate office, can be performed to ensure that computer peripherals are not changed or displaced without authorization. Other system administration tasks can be performed by implementing the principles taught by the present invention.

Once the desired system administration is performed on the standalone computer system 110, the remote diagnostic operation is terminated, as described in block 460 of FIG. 4. The remote diagnostic communication sequence is then terminated, as described in block 470 of FIG. 4. At this point, control of the standalone computer 110 is relinquished by the controlling computer system 120. The principles taught by the present invention may be utilized by one skilled in art, and having the benefit of the present disclosure, to perform various computer-related tasks from a remote location.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for performing remote system administration upon a standalone computer system, using a controlling computer system, comprising:

starting a remote communication sequence;

using said remote communication sequence to initiate a Hyper-Media Managed Object (HMMO) request to a computer destination address;

establishing communications between said controlling computer system and said standalone computer system by decoding said computer destination address; and initiating a diagnostic software application program on said standalone computer system using said established communication between said controlling computer system and said standalone computer system.

2. The method as described in claim 1, wherein starting a remote communication sequence further comprises initiating a web browser application program, using a communication platform coupled with a communication server.

3. The method as described in claim 2, wherein using a communication platform further comprises using a web browser application program.

4. The method as described in claim 1, wherein using said standalone computer system further comprises using a Hyper-Media Managed Object Application Programming Interface.

5. The method as described in claim 1, wherein using said remote communication sequence to initiate an HTTP request to a computer destination address further comprises integrating an ISAPI platform with said communication server.

6. The method as described in claim 5, wherein integrating an ISAPI platform with said communication server further comprises integrating said application program interface with an Internet protocol suite to establish a TCP/IP communication link.

7. The method as described in claim 6, wherein initiating a diagnostic software application program on said standalone computer system using said established communication between said controlling computer system and said standalone computer system further comprises initiating a diagnostic software application program on said standalone computer system through said internet protocol communication link.

8. The method as described in claim 7, wherein said step of using said Internet protocol communication link further comprises using at least one Hypertext Transfer Protocol (HTTP) server.

9. The method as described in claim 1, wherein establishing communications between said controlling computer system and said standalone computer system using said communication control platform further comprises employing an HTTP request detector to monitor HTML data requests.

10. The method as described in claim 1, wherein establishing communications between said controlling computer system and said standalone computer system using said communication control platform further comprises employing an Hyper-Media Management Applications (HMMA) controller for regulating operations of Hyper-Media Management Object Applications.

11. The method as described in claim 1, wherein initiating a diagnostic software application program on said standalone computer system using said established communication between said controlling computer system and said standalone computer system further comprises said controlling computer system performing computer diagnostic operations on said standalone computer system using said established communication between said controlling system and said standalone computer.

12. The method as described in claim 11, wherein performing computer diagnostic operations on said standalone computer system further comprises performing status checks on said standalone computer system.

13. The method as described in claim 11, wherein performing computer diagnostic operations on said standalone computer system further comprises performing system inspection on said standalone computer system.

14. The method as described in claim 11, wherein performing computer diagnostic operations on said standalone computer system further comprises performing tests on said standalone computer system.

15. The method as described in claim 14, wherein performing tests on said standalone computer system further comprises performing tests on a central processing unit (CPU) of said standalone computer system.

16. The method as described in claim 11, wherein performing tests on said standalone computer system further comprises performing tests on subsystems of said standalone computer system.

17. The method as described in claim 1, wherein initiating a diagnostic software application program on said standalone computer system using said established communication between said controlling computer system and said standalone computer system further comprises said controlling computer system performing computer asset management functions on said standalone computer system using said established communication between said controlling system and said standalone computer.

18. The method as described in claim 1, wherein initiating a diagnostic software application program on said standalone computer system using said established communication between said controlling computer system and said standalone computer system further comprises gathering and formatting into HTML computer hardware and operating system information.

19. The method as described in claim 18, further comprising displaying said formatted computer hardware and operating system information.

20. An apparatus for performing remote system administration upon a standalone computer system, using a controlling computer system, comprising:
   means for starting a remote communication sequence;
   means for using said remote communication sequence to initiate an HMMO request to a computer destination address;
   means for establishing communications between said controlling computer system and said standalone computer system by decoding said computer destination address; and
   means for initiating a diagnostic software application program on said standalone computer system using said established communication between said controlling computer system and said standalone computer system.

21. A computer readable program storage device encoded with instructions that, when executed by a computer, performs a method for performing remote system administration upon a standalone computer system, using a controlling computer system, comprising:
   starting a remote communication sequence;
   using said remote communication sequence to initiate a Hyper-Media Managed Object (HMMO) request to a computer destination address;
   establishing communications between said controlling computer system and said standalone computer system by decoding said computer destination address; and
   initiating a diagnostic software application program on said standalone computer system using said established communication between said controlling computer system and said standalone computer system.

22. The computer readable program storage device encoded with instructions that, when executed by a computer, performs the method as described in claim 21, wherein starting a remote communication sequence further comprises initiating a web browser application program, using a communication platform coupled with a communication server.

23. The computer readable program storage device encoded with instructions that, when executed by a computer, performs the method as described in claim 22, wherein using a communication platform further comprises using a web browser application program.

24. The computer readable program storage device encoded with instructions that, when executed by a computer, performs the method as described in claim 21, wherein using said standalone computer system further comprises using a Hyper-Media Managed Object Application Programming Interface.

25. The computer readable program storage device encoded with instructions that, when executed by a computer, performs the method as described in claim 21, wherein using said remote communication sequence to initiate an HTTP request to a computer destination address further comprises integrating an ISAPI platform with said communication server.

26. The computer readable program storage device encoded with instructions that, when executed by a computer, performs the method as described in claim 25, wherein integrating an ISAPI platform with said communication server further comprises integrating said application program interface with an Internet protocol suite to establish a TCP/IP communication link.

27. The computer readable program storage device encoded with instructions that, when executed by a computer, performs the method as described in claim 26, wherein initiating a diagnostic software application program on said standalone computer system using said established communication between said controlling computer system and said standalone computer system further comprises initiating a diagnostic software application program on said standalone computer system through said internet protocol communication link.

28. The computer readable program storage device encoded with instructions that, when executed by a computer, performs the method as described in claim 27, wherein said step of using said Internet protocol communication link further comprises using at least one Hypertext Transfer Protocol (HTTP) server.

29. The computer readable program storage device encoded with instructions that, when executed by a computer, performs the method as described in claim 21, wherein establishing communications between said controlling computer system and said standalone computer system using said communication control platform further comprises employing an HTTP request detector to monitor HTML data requests.

30. The computer readable program storage device encoded with instructions that, when executed by a computer, performs the method as described in claim 21, wherein establishing communications between said controlling computer system and said standalone computer system using said communication control platform further comprises employing an Hyper-Media Management Applications (HMMA) controller for regulating operations of Hyper-Media Management Object Applications.

31. The computer readable program storage device encoded with instructions that, when executed by a computer, performs the method as described in claim 21, wherein initiating a diagnostic software application program on said standalone computer system using said established communication between said controlling computer system and said standalone computer system further comprises said controlling computer system performing computer diagnostic operations on said standalone computer system using said established communication between said controlling system and said standalone computer.

32. The computer readable program storage device encoded with instructions that, when executed by a computer, performs the method as described in claim 31, wherein performing computer diagnostic operations on said standalone computer system further comprises performing status checks on said standalone computer system.

33. The computer readable program storage device encoded with instructions that, when executed by a computer, performs the method as described in claim 31, wherein performing computer diagnostic operations on said standalone computer system further comprises performing system inspection on said standalone computer system.

34. The computer readable program storage device encoded with instructions that, when executed by a computer, performs the method as described in claim 31, wherein performing computer diagnostic operations on said standalone computer system further comprises performing tests on said standalone computer system.

35. The computer readable program storage device encoded with instructions that, when executed by a computer, performs the method as described in claim 34, wherein performing tests on said standalone computer system further comprises performing tests on a central processing unit (CPU) of said standalone computer system.

36. The computer readable program storage device encoded with instructions that, when executed by a computer, performs the method as described in claim 31, wherein performing tests on said standalone computer system further comprises performing tests on subsystems of said standalone computer system.

37. The computer readable program storage device encoded with instructions that, when executed by a computer, performs the method as described in claim 21, wherein initiating a diagnostic software application program on said standalone computer system using said established communication between said controlling computer system and said standalone computer system further comprises said controlling computer system performing computer asset management functions on said standalone computer system using said established communication between said controlling system and said standalone computer.

38. The computer readable program storage device encoded with instructions that, when executed by a computer, performs the method as described in claim 21, wherein initiating a diagnostic software application program on said standalone computer system using said established communication between said controlling computer system and said standalone computer system further comprises gathering and formatting into HTML computer hardware and operating system information.

39. The computer readable program storage device encoded with instructions that, when executed by a computer, performs the method as described in claim 38, further comprising displaying said formatted computer hardware and operating system information.

* * * * *